(12) United States Patent
Cai

(10) Patent No.: US 11,988,358 B2
(45) Date of Patent: May 21, 2024

(54) LIGHT FIXTURE INCLUDING A HOUSING FOR A BALLAST

(71) Applicant: HGCI, Inc., Las Vegas, NV (US)

(72) Inventor: Dengke Cai, Camas, WA (US)

(73) Assignee: HGCI, Inc., Las Vegas, NV (US)

( * ) Notice: Subject to any disclaimer, the term of this patent is extended or adjusted under 35 U.S.C. 154(b) by 148 days.

(21) Appl. No.: 17/396,210

(22) Filed: Aug. 6, 2021

(65) Prior Publication Data

US 2022/0049825 A1 Feb. 17, 2022

Related U.S. Application Data

(60) Provisional application No. 63/065,485, filed on Aug. 13, 2020, provisional application No. 63/064,890, filed on Aug. 12, 2020.

(51) Int. Cl.
| | |
|---|---|
| *F21S 8/00* | (2006.01) |
| *F21V 7/00* | (2006.01) |
| *F21V 23/02* | (2006.01) |
| *F21V 29/74* | (2015.01) |
| *F21Y 115/10* | (2016.01) |

(52) U.S. Cl.
CPC ............ *F21S 8/036* (2013.01); *F21V 7/0016* (2013.01); *F21V 23/026* (2013.01); *F21V 29/74* (2015.01); *F21Y 2115/10* (2016.08)

(58) Field of Classification Search
CPC ........ F21S 8/036; F21V 29/74; F21V 7/0016; F21V 23/026; F21Y 2115/10
See application file for complete search history.

(56) References Cited

U.S. PATENT DOCUMENTS

| | | | |
|---|---|---|---|
| 3,705,302 A * | 12/1972 | Judge | F21S 8/06 362/348 |
| 4,715,438 A | 12/1987 | Gabuzda et al. | |
| 6,565,238 B1 | 5/2003 | Pyrtle | |
| 2009/0046464 A1* | 2/2009 | Liu | F21K 9/00 362/373 |
| 2009/0145581 A1 | 6/2009 | Hoffman et al. | |
| 2009/0303717 A1* | 12/2009 | Long | F21V 29/75 362/249.02 |
| 2011/0050070 A1 | 3/2011 | Pickard | |
| 2011/0079370 A1 | 4/2011 | Wen et al. | |
| 2020/0049418 A1* | 2/2020 | Chu | F28D 15/0233 |
| 2022/0293487 A1* | 9/2022 | Teranishi | H05K 7/20409 |

OTHER PUBLICATIONS

Rodriquez, Kari; International Search Report and Written Opinion of the International Searching Authority, issued In International Application No. PCT/US2021/044678; dated Jan. 19, 2022; 13 pages.

* cited by examiner

*Primary Examiner* — Gerald J Sufleta, II
(74) *Attorney, Agent, or Firm* — Frost Brown Todd LLP

(57) ABSTRACT

A light fixture includes a lighting module and a ballast. The ballast includes a housing and a power module. The housing includes a front cover and a rear cover. The front cover includes a front wall and upper fins and lower fins that extend from the front wall. The rear cover includes a rear wall and first fins and second fins that extend from the rear wall. The power module includes a plurality of heat generating semiconductor components that are thermally coupled with the rear wall to facilitate cooling thereof.

22 Claims, 13 Drawing Sheets

LIGHT FIXTURE INCLUDING A HOUSING FOR A BALLAST

REFERENCE TO RELATED APPLICATION

This application claims priority of U.S. provisional patent application Ser. No. 63/064,890, entitled Light Fixture Including Housing for Ballast and Methods for Manufacturing Same, filed Aug. 12, 2020, and Ser. No. 63/065,485, entitled Light Fixture Including Housing for Ballast and Methods for Manufacturing Same, filed Aug. 13, 2020, and hereby incorporates these applications by reference herein in their respective entireties.

TECHNICAL FIELD

The apparatus described below generally relates to a light fixture that includes a ballast. The ballast is disposed in a housing that facilitates cooling of the ballast.

BACKGROUND

Indoor grow facilities, such as greenhouses, include high intensity light fixtures that provide artificial lighting to plants for encouraging growth. Each of these light fixtures includes a ballast that facilitates operation of a light source (e.g., a light bulb). The ballast is housed in a housing that facilitates cooling of a power module that is housed therein.

BRIEF DESCRIPTION OF THE DRAWINGS

Various embodiments will become better understood with regard to the following description, appended claims and accompanying drawings wherein:

DETAILED DESCRIPTION

Figure 1:
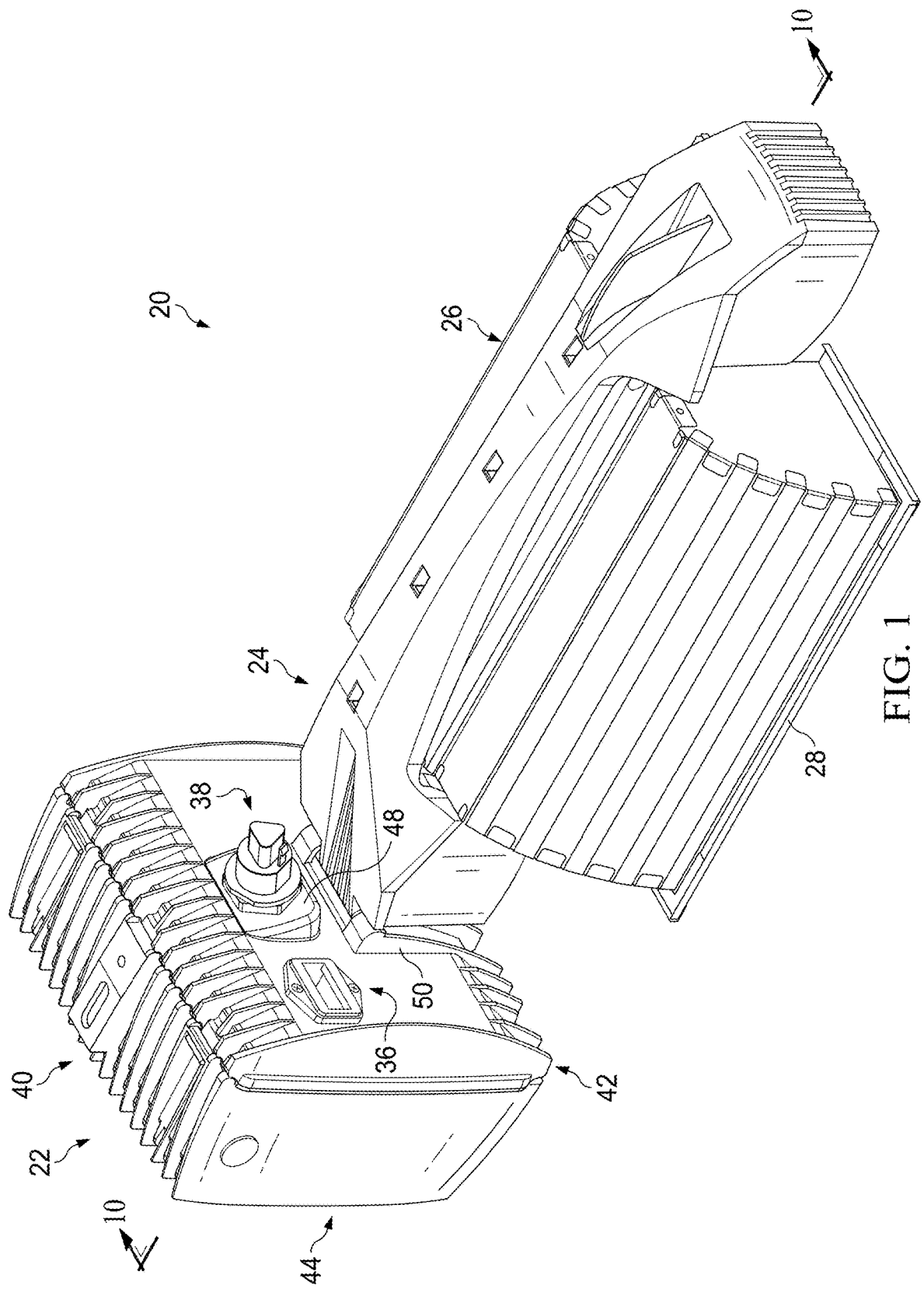
FIG. 1 is a front upper isometric view depicting a light fixture that includes a ballast, in accordance with one embodiment.
Figure 2:
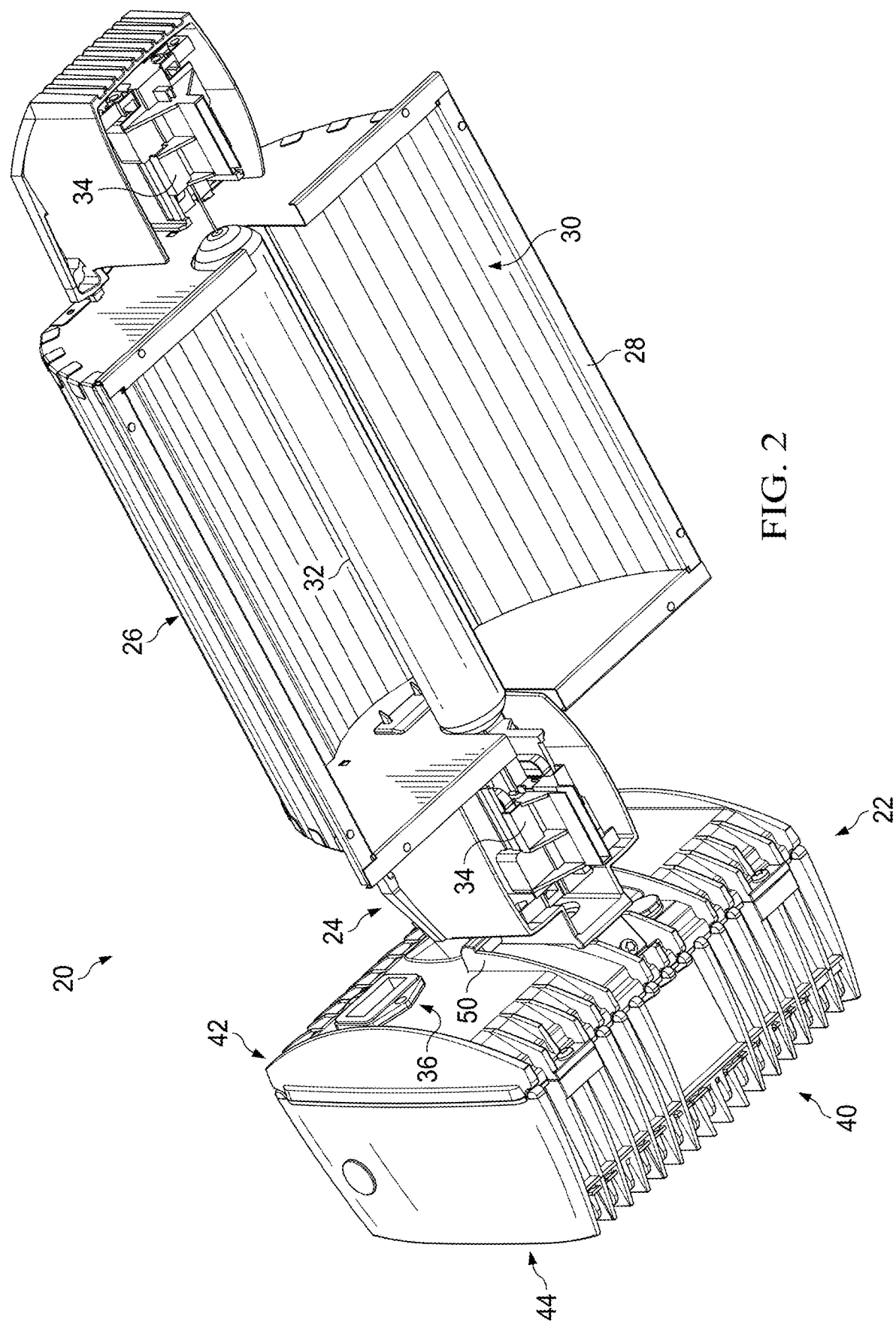
FIG. 2 is a rear lower upper isometric view of the light fixture of FIG. 1.

Embodiments are hereinafter described in detail in connection with the views and examples of FIGS. 1-13, wherein like numbers indicate the same or corresponding elements throughout the views. A light fixture 20 for an indoor grow facility (e.g., a greenhouse) is generally depicted in FIGS. 1 and 2 and can include a ballast 22, a bracket 24, and a reflector 26 coupled with the bracket 24. As illustrated in FIG. 2, the reflector 26 can comprise a lower lip 28 that defines an opening 30. A light bulb 32 can be disposed at least partially within the opening 30 and can be coupled with the bracket 24 via sockets 34. The light bulb 32 can be configured to generate light for delivery through the opening 30 to an underlying plant to stimulate growth. In one embodiment, the light bulb 32 can be an HID bulb. It is to be appreciated that any of a variety of suitable alternative lighting modules are contemplated, such as for example a plurality of light emitting diodes (LEDs) (not shown).

The ballast 22 can include a power input 36 that is coupled with a power source (not shown), such as an A/C power source, for delivering external power to the light fixture 20 for powering the lighting module. In one embodiment, the light fixture 20 can be configured to operate at an input power of between about 85 VAC and about 347 VAC (e.g., a 750 Watt load capacity). The ballast 22 can include a control input 38 that is coupled with a control source (not shown), such as a greenhouse controller, for example, that delivers a control signal to the light fixture 20 for controlling the lighting module. The light fixture 20 can be configured to communicate according to any of a variety if suitable signal protocols, such as BACnet, ModBus, or RS485, for example.

The ballast 22 can include a housing 40 that is coupled with the bracket 24. The housing 40 can include a front cover 42 and a rear cover 44 that are coupled together and cooperate to define an interior chamber 46 (see FIGS. 10 and 11). The ballast 22 can be arranged such that the front cover 42 is more proximate the reflector 26 than the rear cover 44. As illustrated in FIG. 2, the power input 36 and the control input 38 can be coupled with the front cover 42. The front cover 42 can define a sloped socket 48 to which the control input 38 is coupled. The sloped socket 48 can facilitate routing of water or other liquid away from the control input 38 and the front cover 42. The front cover 42 can also include a support portion 50 that can be coupled with the bracket 24.

Figure 3:
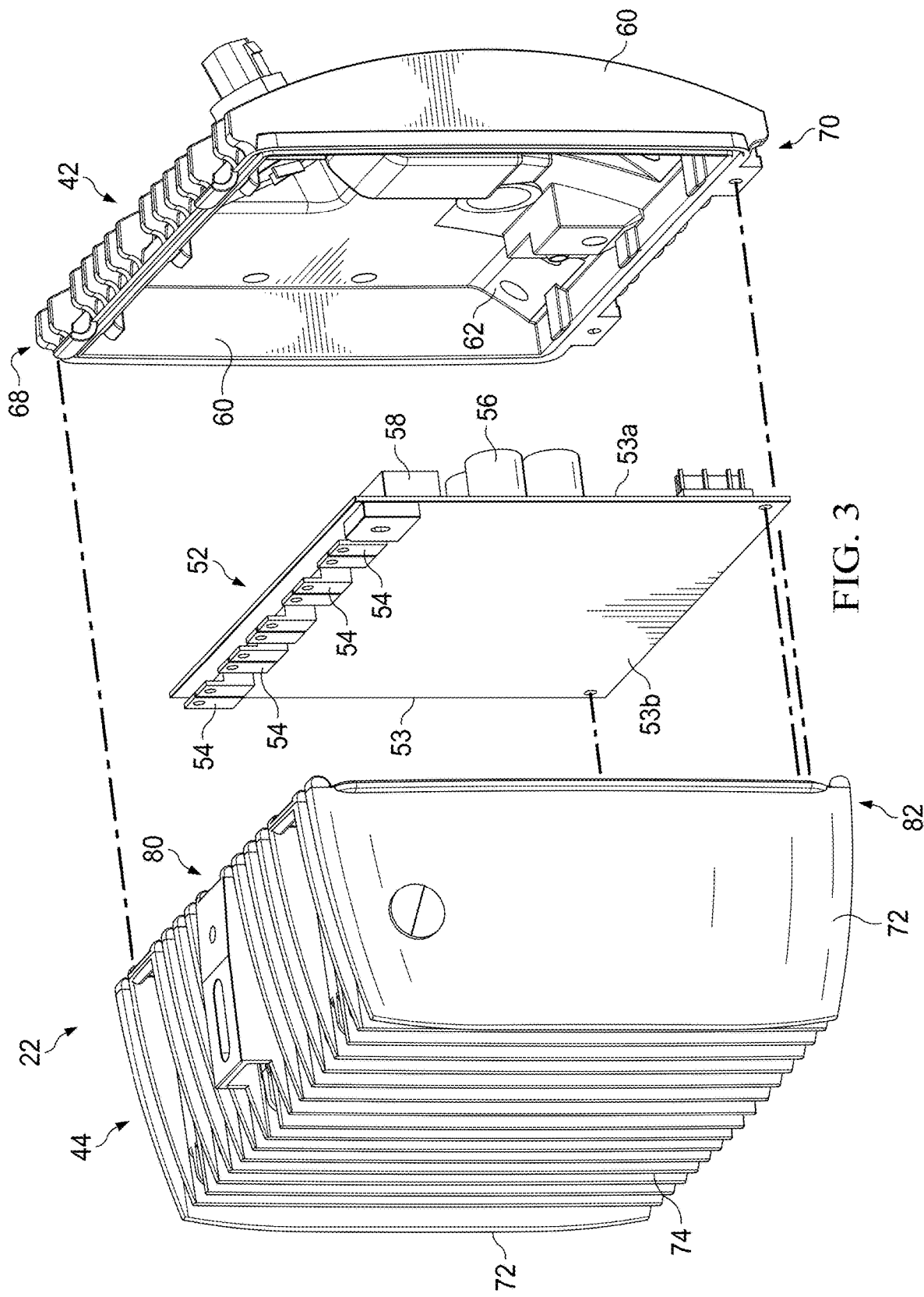
FIG. 3 is an exploded view of the ballast of FIG. 1.

Referring now to FIG. 3, the ballast 22 can include a power module 52 that is disposed in the housing 40 (e.g., in the interior chamber 46) and is configured to facilitate powering of the light bulb 32 with power received at the power input 36. The power module 52 can include a substrate 53, a plurality of transistors 54, a plurality of capacitors 56, and a transformer 58, as well as other electrical components (not shown) that are mounted to the substrate 53 and that cooperate to facilitate powering of the light bulb 32. The substrate 53 can include a front surface 53a and a rear surface 53b. The front surface 53a can be more proximate to the light bulb 32 than the rear surface 53b. The plurality of capacitors 56 and the transformer 58 can be mounted to the front surface 53a. The transistors 54 can be mounted to the rear surface 53b. In one embodiment, the transistors 54 can comprise MOSFETs. As will be described in further detail below, the transistors 54 can be thermally coupled with the rear cover 44 of the housing 40 to facilitate dissipation of heat from the transistors 54 via the rear cover 44. It is appreciated, that any of a variety of suitable alternative heat generating semiconductor components can be included on the power module 52 which can be thermally coupled with the housing 40 to facilitate heat dissipation therefrom. The power module 52 can be surrounded by the front cover 42 and the rear cover 44 such that the power module 52 is disposed in the interior chamber 46.

Figure 4:
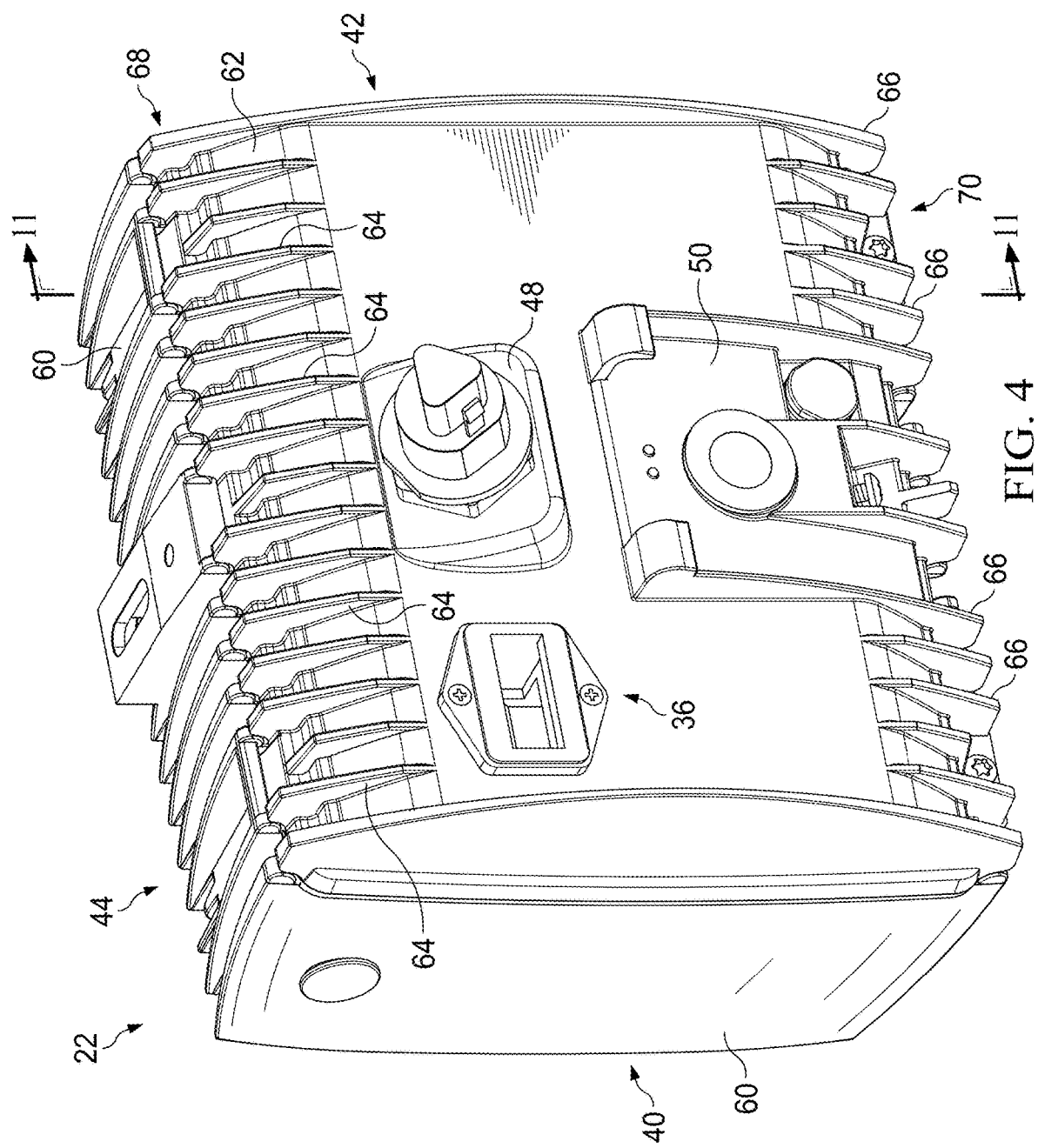
FIG. 4 is a front upper isometric view of the ballast of FIG. 1.

Referring now to FIG. 4, the front cover 42 can include a plurality of sidewalls 60 and a front wall 62 that extends between the sidewalls 60. The plurality of sidewalls 60 and the front wall 62 can cooperate to at least partially define the interior chamber 46. The front cover 42 can include a plurality of upper fins 64 and a plurality of lower fins 66 that extend from the front wall 62 and cooperate to serve as a heat sink that dissipates heat from the front cover 42 to facilitate cooling of the power module 52 via the front cover 42. The upper fins 64 can be disposed at an upper end 68 of the front cover 42 and the lower fins 66 can be disposed at a lower end 70 of the front cover 42. The front cover 42 can be formed of any of a variety of a thermally conductive materials, such as aluminum or copper, for example. In one embodiment, the front cover 42 can be formed of a unitary one-piece construction such as, for example, through a molding (e.g., casting) or an extrusion process.

Figure 5:
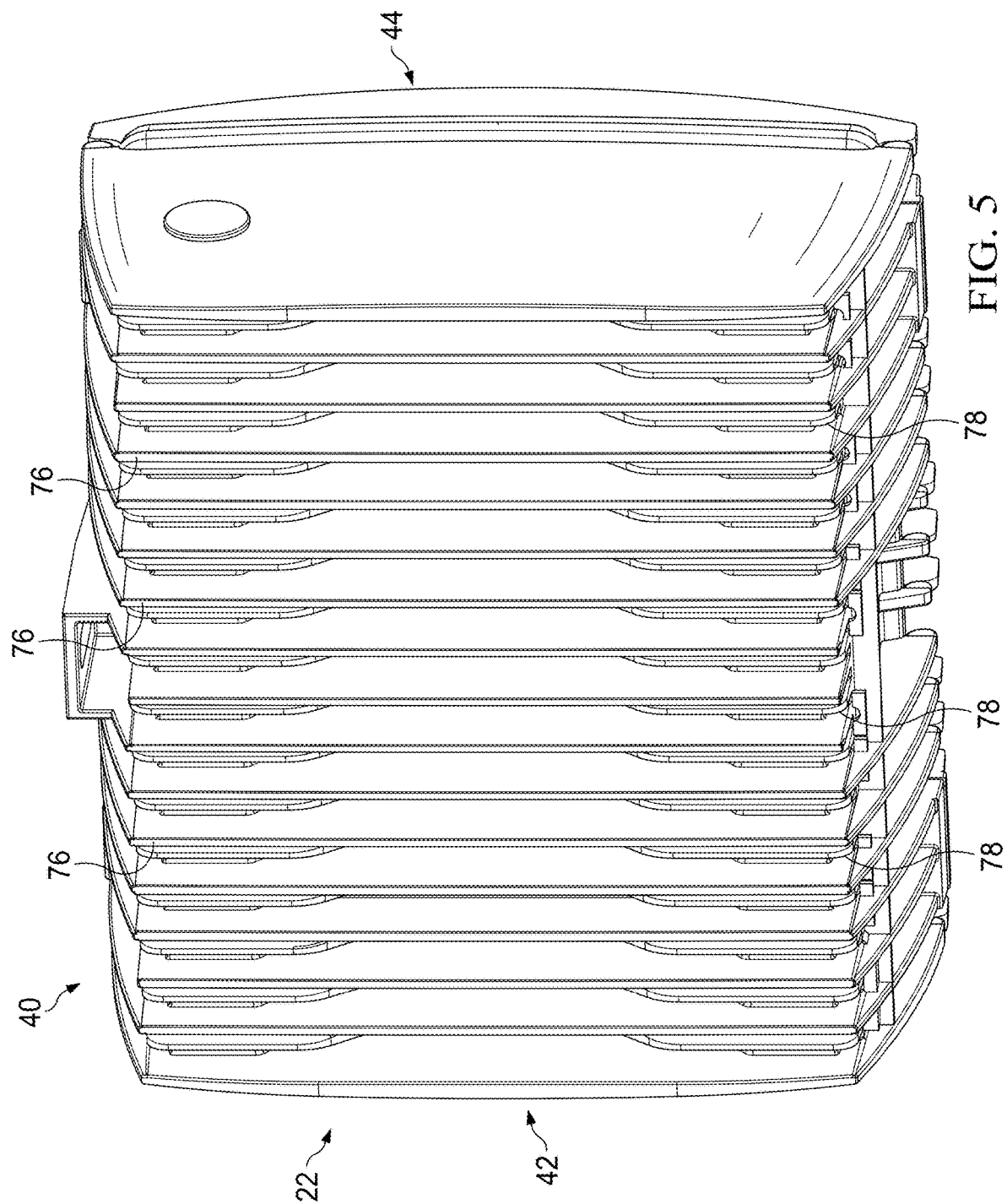
FIG. 5 is a rear lower isometric view of the ballast of FIG. 1.
Figure 6:
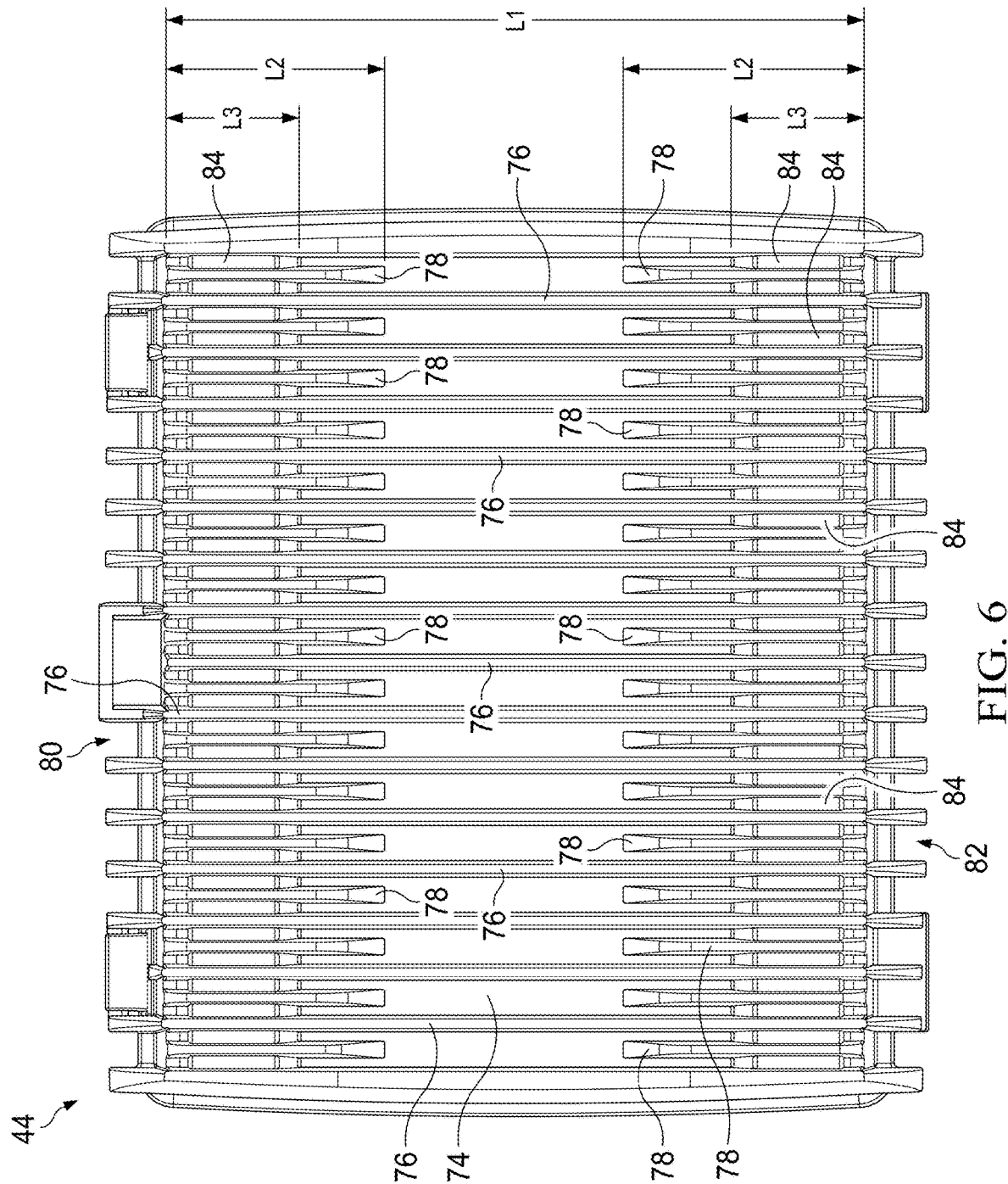
FIG. 6 is a rear elevation view of the ballast of FIG. 1.
Figure 7:
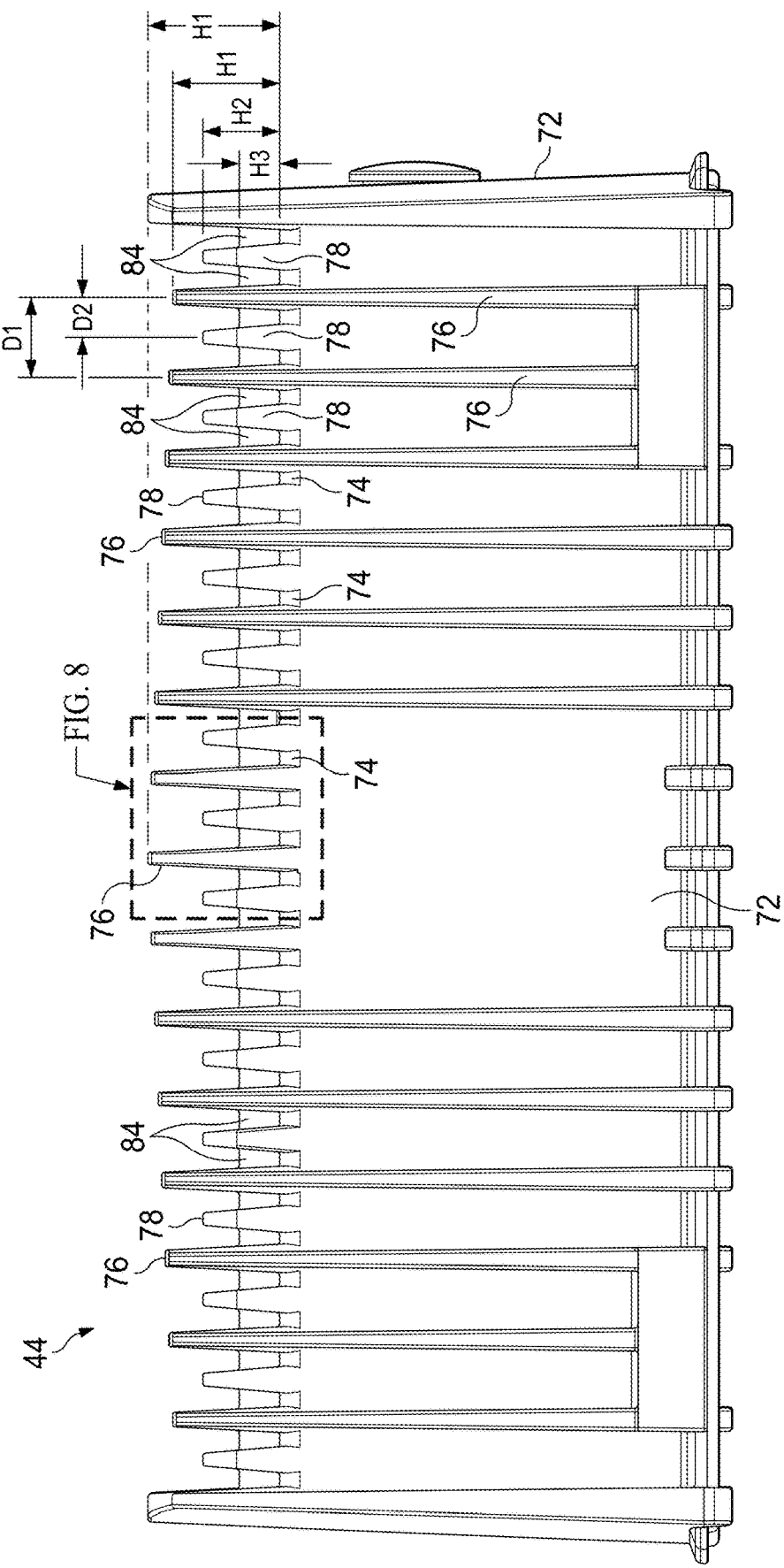
FIG. 7 is a bottom plan view of a rear cover of the ballast of FIG. 1.

Referring now to FIGS. 5-7, the rear cover 44 can include a plurality of sidewalls 72 and a rear wall 74 that extends between the sidewalls 72. The plurality of sidewalls 72 and the rear wall 74 can cooperate to at least partially define the interior chamber 46. The rear cover 44 can include a plurality of first fins 76 and a plurality of second fins 78 that extend from the rear wall 74 and cooperate to serve as a heat sink that dissipates heat from the rear cover 44 to facilitate cooling of the power module 52. The rear cover 44 can be formed of any of a variety of a thermally conductive materials, such as aluminum or copper, for example. In one embodiment, the rear cover 44 can be formed of a unitary one-piece construction such as, for example, through a molding (e.g., casting) or an extrusion process. As will be described in further detail below, the rear cover 44 can be in thermal contact with the transistors 54 such that heat generated by the transistors 54 can be dissipated to the surrounding environment by the first and second fins 76, 78.

Referring now to FIG. 6, each of the first fins 76 can extend substantially continuously along the rear wall 74 between an upper end 80 and a lower end 82 of the rear cover 44 and can have a length L1. Each of the second fins 78 can be disposed laterally between immediately adjacent ones of the first fins 76 and can have a length L2. The first fins 76 can be longer than the second fins 78 such that the length L1 of the first fins 76 is greater than the length L2 of the second fins 78. Each of the second fins 78 can be longitudinally spaced from each other such that some of the second fins 78 are disposed at the upper end 80 of the rear cover 44 and others of the second fins 78 are disposed at the lower end 82 of the rear cover 44. During operation of the light fixture 20, the heat from the power module 52 can be concentrated at the upper and lower ends 80, 82 of the rear cover 44. By concentrating the second fins 78 at the upper and lower ends 80, 82 of the rear cover 44, this additional heat can be effectively dissipated without requiring each of the second fins 78 to extend continuously along the rear wall 74 as is common in conventional arrangements. The rear cover 44 can accordingly require less material and can therefore be more cost effective than conventional arrangements. In one embodiment, a ratio of the length L1 of the first fins 76 to the length L2 of the second fins 78 can be between about 2.1:1 to about 3:1. It is to be appreciated that the first and second fins 76, 78 can have any of a variety of suitable alternative longitudinal profiles. For example, in one embodiment, each of first fins (e.g., 76) can be provided in a longitudinally discontinuous arrangement. The first and second fins 76, 78 are shown to have a frusto-pyramidical three-dimensional shape having a longer length (measured between the upper end 80 and the lower end 82) than width. It is to be appreciated, however, that the first and second fins 76, 78 can have any of a variety of suitable alternative three-dimensional shapes.

Referring now to FIG. 7, each of the first fins 76 can have a height (e.g., H1) and each of the second fins 78 can have a height H2. Each of the first fins 76 can be taller than the second fins 78 such that the height (e.g., H1) of the first fins 76 is greater than the height H2 of the second fins 78 (both heights H1 and H2 being measured relative to the rear wall 74). The heights (e.g., H1) of the first fins 76 can be different relative to each other. In one embodiment, as illustrated in FIG. 7, the height H1 of the first fins 76 can be tallest at a center of the rear cover 44 (e.g., H1 shown in dashed line) and shortest at a location that is most proximate to the sidewall 72 (e.g., H1 shown in solid line). The height H1 of each of the first fins 76 disposed therebetween can be less than the height of the first fins 76 at the center of the rear cover 44 (e.g., H1 shown in dashed line) and greater than the height H1 of the first fins 76 that are most proximate to the sidewall 72. In one embodiment, the heights (e.g., H1) of each of the first fins 76 can gradually decrease the further away the first fin 76 is from the center of the rear cover 44 such that the first fins 76 can cooperate to define a contoured two-dimensional shape. In one embodiment, the ratio of the height H1 to the height H2 can be between about 1.1:1 and about 1.7:1. In one embodiment, the height H1 can be between about 15 mm and 18 mm and the height H2 can be about 11 mm.

Each of the first fins 76 can be laterally spaced from each other by a distance D1 and from adjacent ones of the second fins 78 by a distance D2 (both distances D1 and D2 being measured from the center of the first fins 76 and the second fins 78, respectively). The distance D2 can be about half of the distance D1 such that the ratio of the distance D1 to the distance D2 is about 2:1. In one embodiment, the distance D1 can be about 11 mm and the distance D2 can be about 5.75 mm.

A shoulder portion 84 can extend between respective ones of the first and second fins 76, 78 and can enhance the heat dissipation properties of the first and second fins 76, 78. The shoulder portion 84 can have a height H3 (as measured from the rear wall 74) that is less than the height H1 and the height H2. In one embodiment, the ratio of the height H2 to the height H3 can be between about 1.1:1 to about 3:1. Each shoulder portion 84 can have a length L3 (see FIG. 6) that is less than the lengths L1 and L2.

Figure 8:
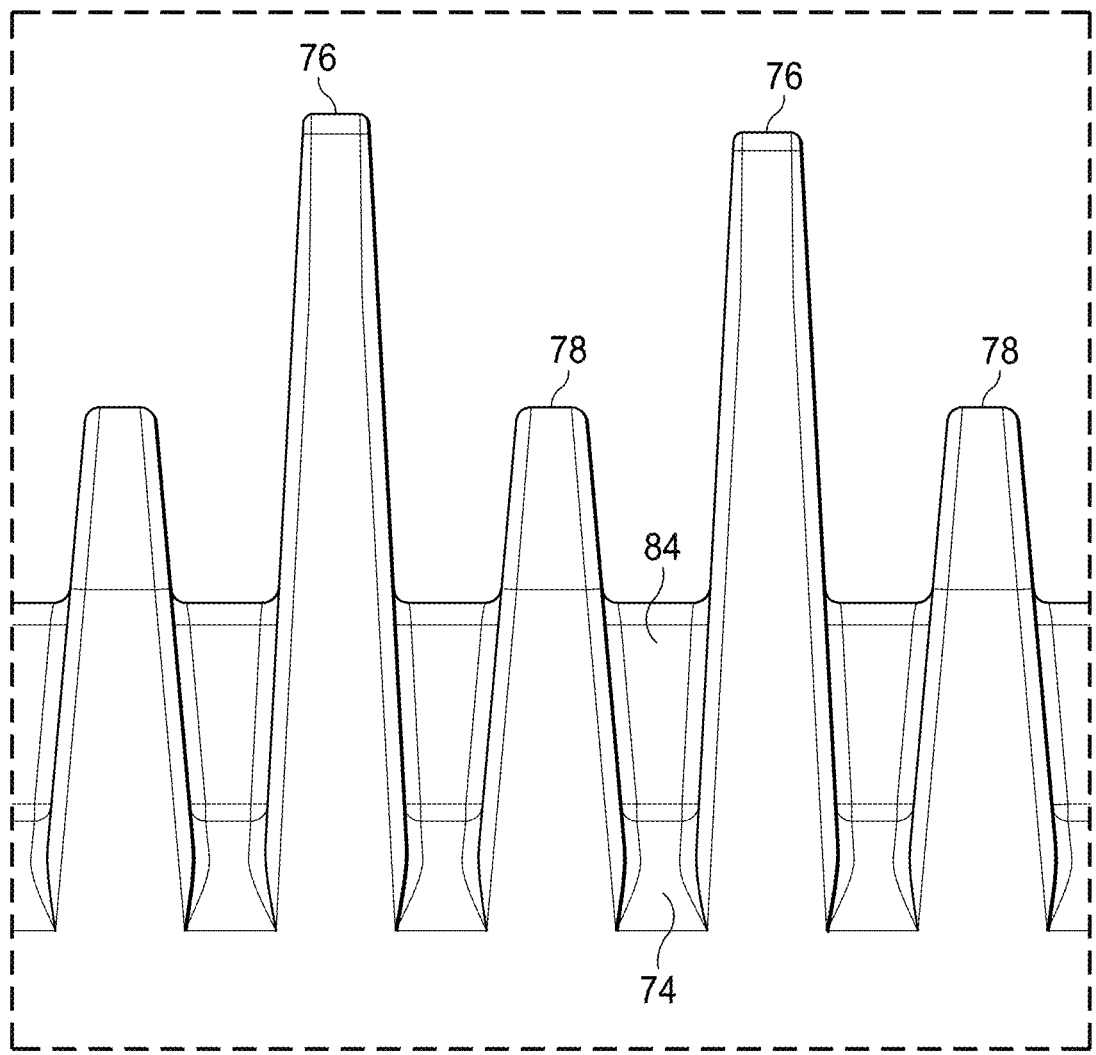
FIG. 8 is an enlarged view of the encircled portion of FIG. 7.

Referring now to FIG. 8, the first and second fins 76, 78 can each have a substantially tapered shape in the widthwise direction (e.g., a frusto-triangular two-dimensional shape when viewed from either the upper end 80 or the lower end 82 of the rear cover 44) such that respective bottom portions of the first and second fins 76, 78 can be wider than respective top portions of the first and second fins 76, 78. It is to be appreciated, however, that the first and second fins 76, 78 can have any of a variety of suitable alternative two-dimensional shapes.

The first and second fins 76, 78 can cooperate to provide sufficient surface area and a high enough aspect ratio to effectively cool the transistors 54 (and thus the power module 52) during operation. The difference in the heights H1, H2 between the first and second fins 76, 78, respectively, the respective shapes (e.g., both two-dimensional and three-dimensional shape) of the first and second fins 76, 78, and the spacing between the first and second fins 76, 78 (e.g., the fin density) can allow the rear cover 44 to be diecast (as opposed to extruded). The rear cover 44, when diecast, can accordingly perform as well as conventional extruded cover arrangements but can have a smaller form factor, can be more aesthetically pleasing, and can be less expensive while also being capable of being properly powder coated (without having excessive internal discharge between the first and second fins 76, 78 that would otherwise repel the powder coating). It is to be appreciated that, although the first and second fins 76, 78 are shown to extend substantially vertically along the rear wall 74, the first and second fins 76, 78 can be additionally or alternatively arranged horizontally or in any of a variety of suitable orientations.

Figure 9:
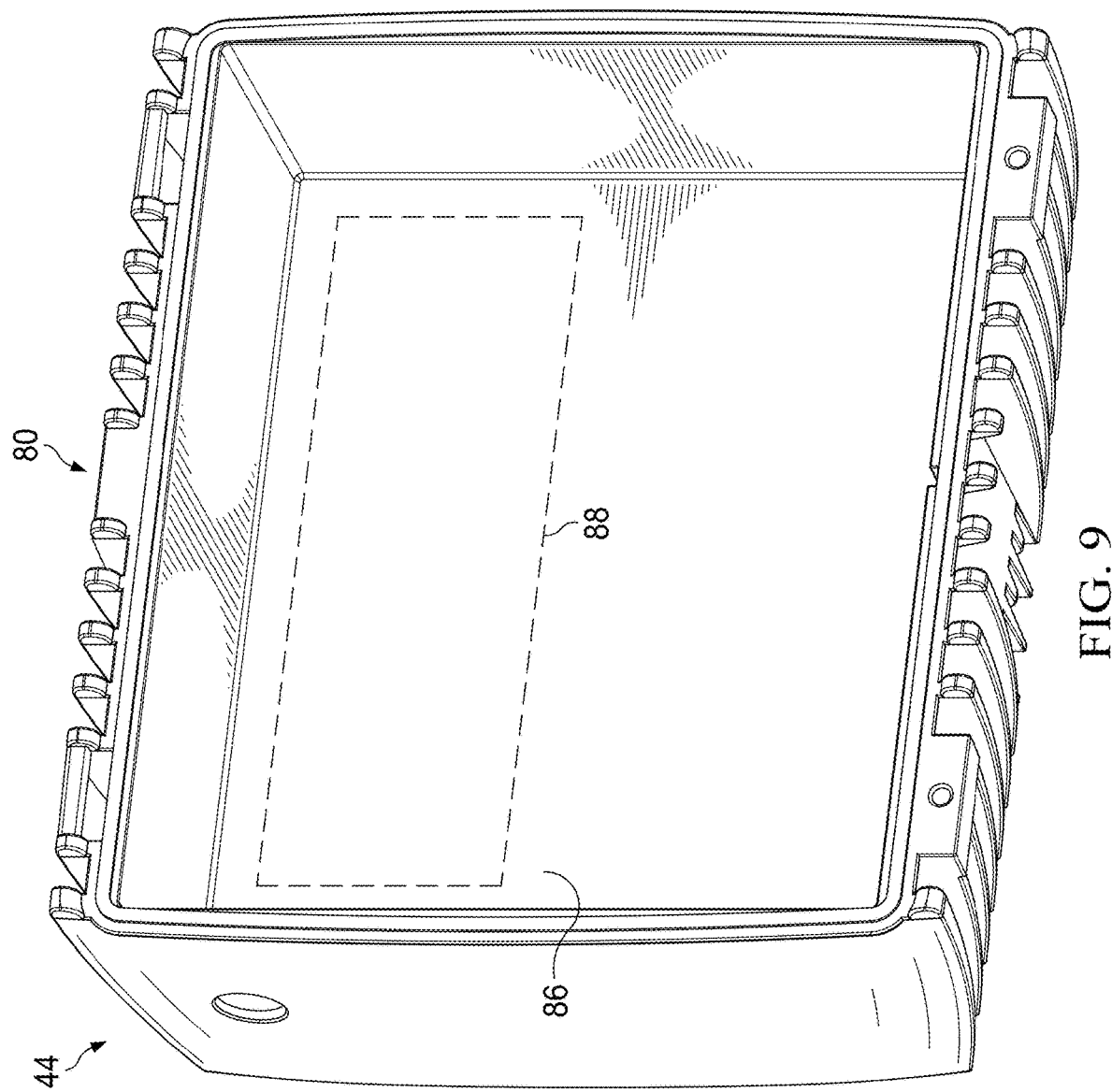
FIG. 9 is a front lower perspective view of the rear cover of FIG. 7.
Figure 10:
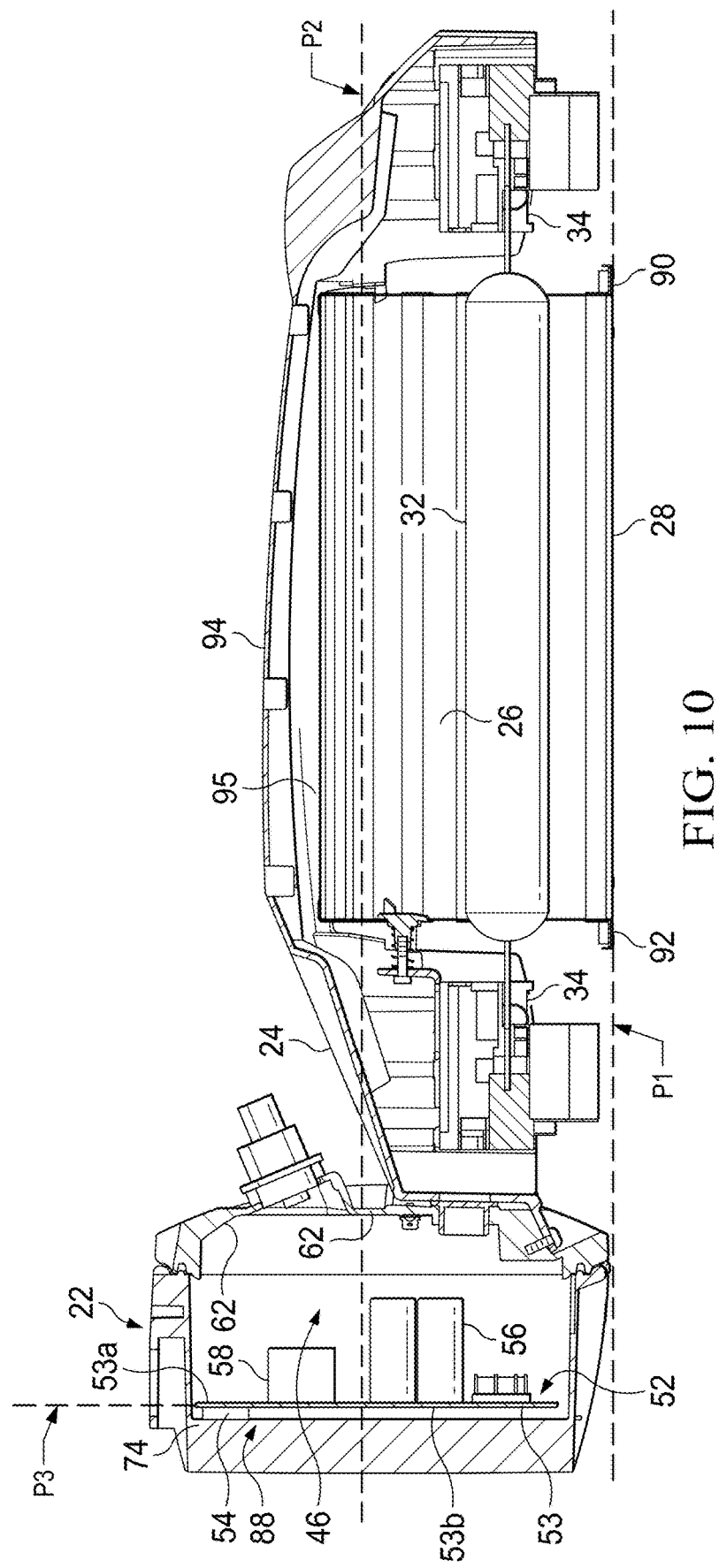
FIG. 10 is a cross-sectional view taken along the line 10-10 in FIG. 1.

Referring now to FIGS. 9 and 10, the rear wall 74 of the rear cover 44 can include an interior surface 86 that defines an upper zone 88 (shown in dashed lines) located at the upper end 80 of the rear cover 44. As illustrated in FIG. 10, the transistors 54 of the power module 52 can be thermally coupled to the interior surface 86 (i.e., contacting the interior surface 86) and disposed entirely within the upper zone 88. In one embodiment, a heat sink compound (not shown), such as thermal paste, can be provided between the transistors 54 and the interior surface 86 to enhance the thermal conductivity therebetween.

The lower lip 28 of the reflector 26 can include a front edge 90 and a rear edge 92 that reside in an imaginary plane P1. A second imaginary plane P2 can be disposed between the light bulb 32 and an uppermost edge 94 of the bracket 24 and can extend through the front and rear walls 62, 74 of the housing 40. In one embodiment, as illustrated in FIG. 10, the second imaginary plane P2 can be disposed between the light bulb 32 and an uppermost edge 95 of the reflector 26. The second imaginary plane P2 can be parallel to the first imaginary plane P1. The upper zone 88 can be located above the imaginary plane P2 such that the light bulb 32 and the transistors 54 are disposed entirely on opposite sides of the imaginary plane P2.

An imaginary plane P3 can bisect the substrate 53 such that the front surface 53a and the rear surface 53b are on opposite sides of the imaginary plane P3. The imaginary plane P3 can be perpendicular to each of the imaginary planes P1, P2. By providing the transistors 54 on the rear surface 53b of the substrate, the transistors 54 can be disposed on an opposite side of the plane P3 as the reflector 26 and the light bulb 32 and can accordingly face away from the reflector 26 and the light bulb 32 and face towards the rear wall 74. The substrate 32 can shield the transistors 54 from at least some of the heat generated by the light bulb 32 which can enhance the overall performance of the transistors 54. In addition, by providing the transistors 54 at the upper zone 88 and mounting them to the interior surface 86 (see FIG. 9) of the rear wall 74, the transistors 54 can be horizontally and vertically spaced from the light bulb 32 (e.g., on an opposite side of each of the imaginary planes P2, P3) than the light bulb 32. Such physical spacing can distance the transistors 54 from the light bulb 32 more effectively than conventional arrangements which can enhance the heat dissipation characteristics between the transistors 54 and the rear cover 44 (e.g., by attaching the transistors 54 to the coolest area on the rear cover 44). Such cooling can prevent the need to use a U-shaped bracket or other device that is conventionally used for attaching transistors to a ballast housing. The reflector 26 and the housing 40 can be laterally spaced apart from each other which can encourage the flow of cooling air between the reflector 26 and the housing 40 to enhance cooling of the upper zone 88.

Figure 11:
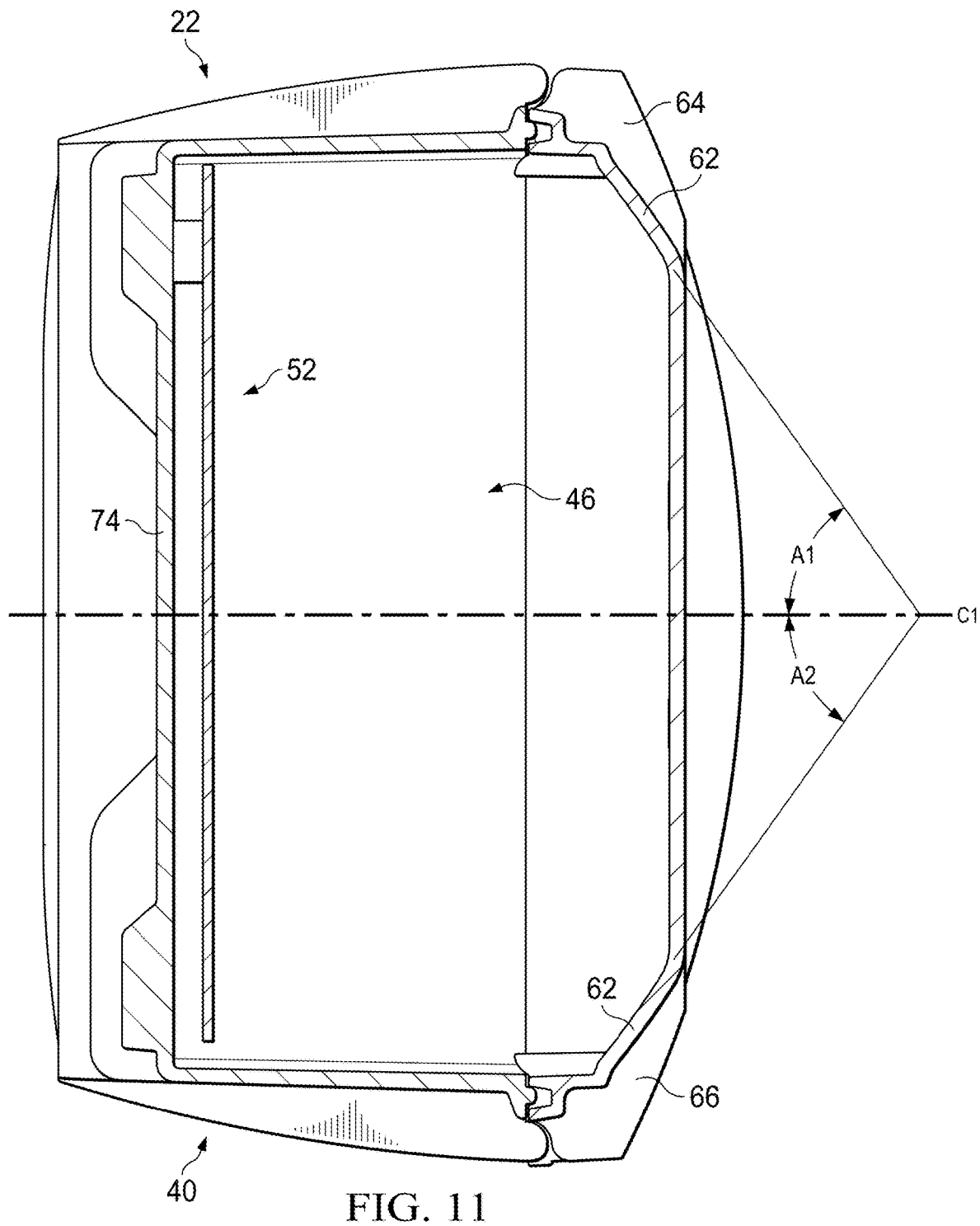
FIG. 11 is a cross-sectional view taken along the line 11-11 in FIG. 4.

Referring now to FIG. 11, the housing 40 can define a centerline C1 that extends between the front wall 62 and the rear wall 74 and along a physical center of the housing 40. The centerline C1 can be parallel to the imaginary plane P1.

The upper fins 64 and the lower fins 66 can be disposed on opposite sides of the centerline C1. The portion of the front wall 62 located at the upper fins 64 and the lower fins 66 can be angled towards the rear wall 74 and with respect to the centerline C1 by acute angles A1 and A2, respectively. In one embodiment, the acute angles A1 and A2 can be substantially the same and can be between about 45 degrees and about 60 degrees. A wall being described as angled towards the rear wall 74 can be understood to mean that the wall is furthest from the rear wall 74 at the centerline C1 and extends towards the rear wall 74 as the wall extends away from the centerline C1. The portion of the front wall 62 located at the upper fins 64 and the lower fins 66 can cooperate with the rest of the front wall 62 to define a substantially convex-shape for the front wall 62 (e.g., the front wall 62 slopes from the support portion 50 and towards the sidewalls 72 of the rear cover 44). The convex-shape of the front wall 62 can allow for heat from the light bulb 32 to flow more easily around the housing 40 thereby cooling the housing 40 more effectively than conventional arrangements (e.g., with substantially planar front surfaces).

Figure 12:
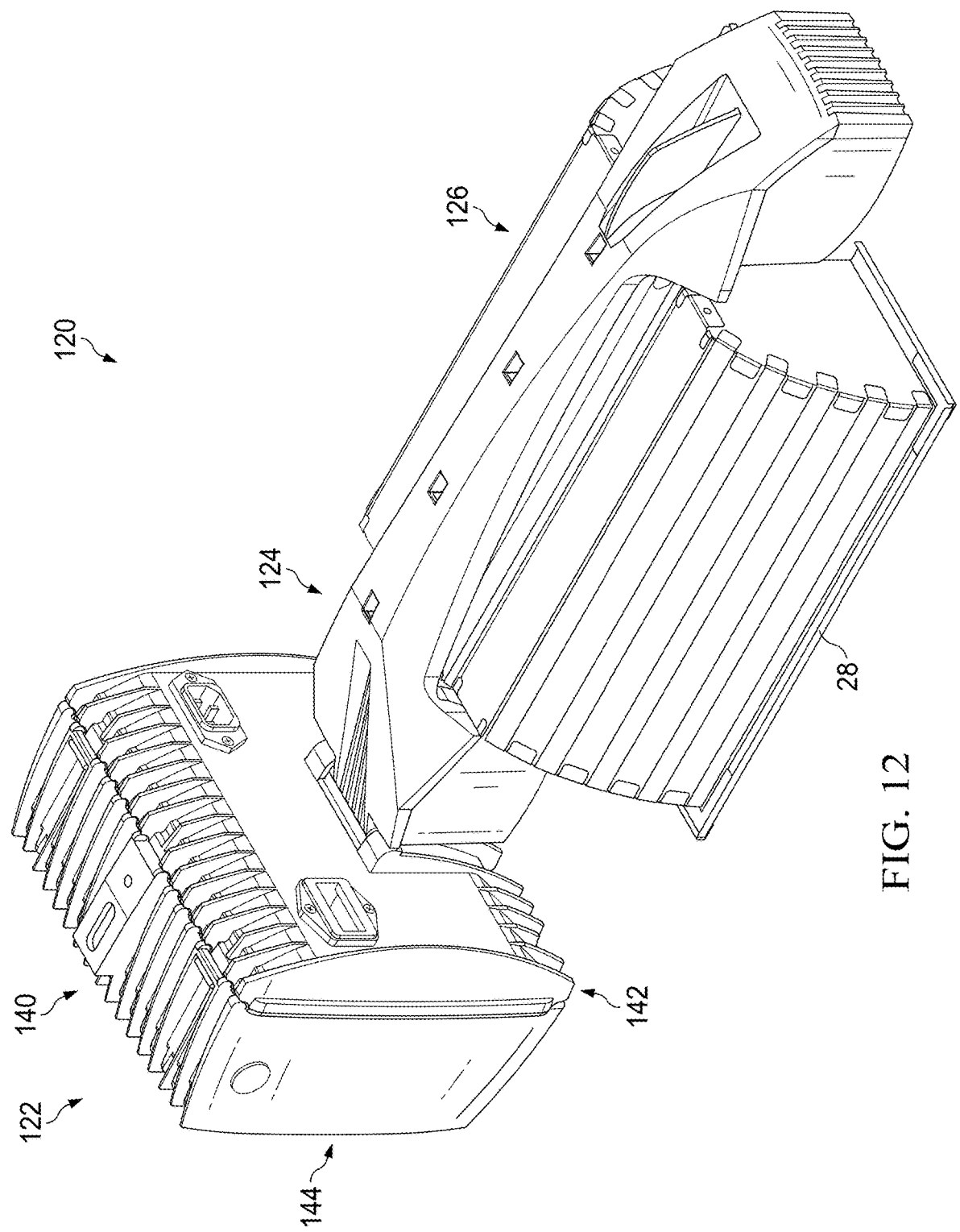
FIG. 12 is a front upper isometric view depicting a light fixture that includes a ballast, in accordance with another embodiment.
Figure 13:
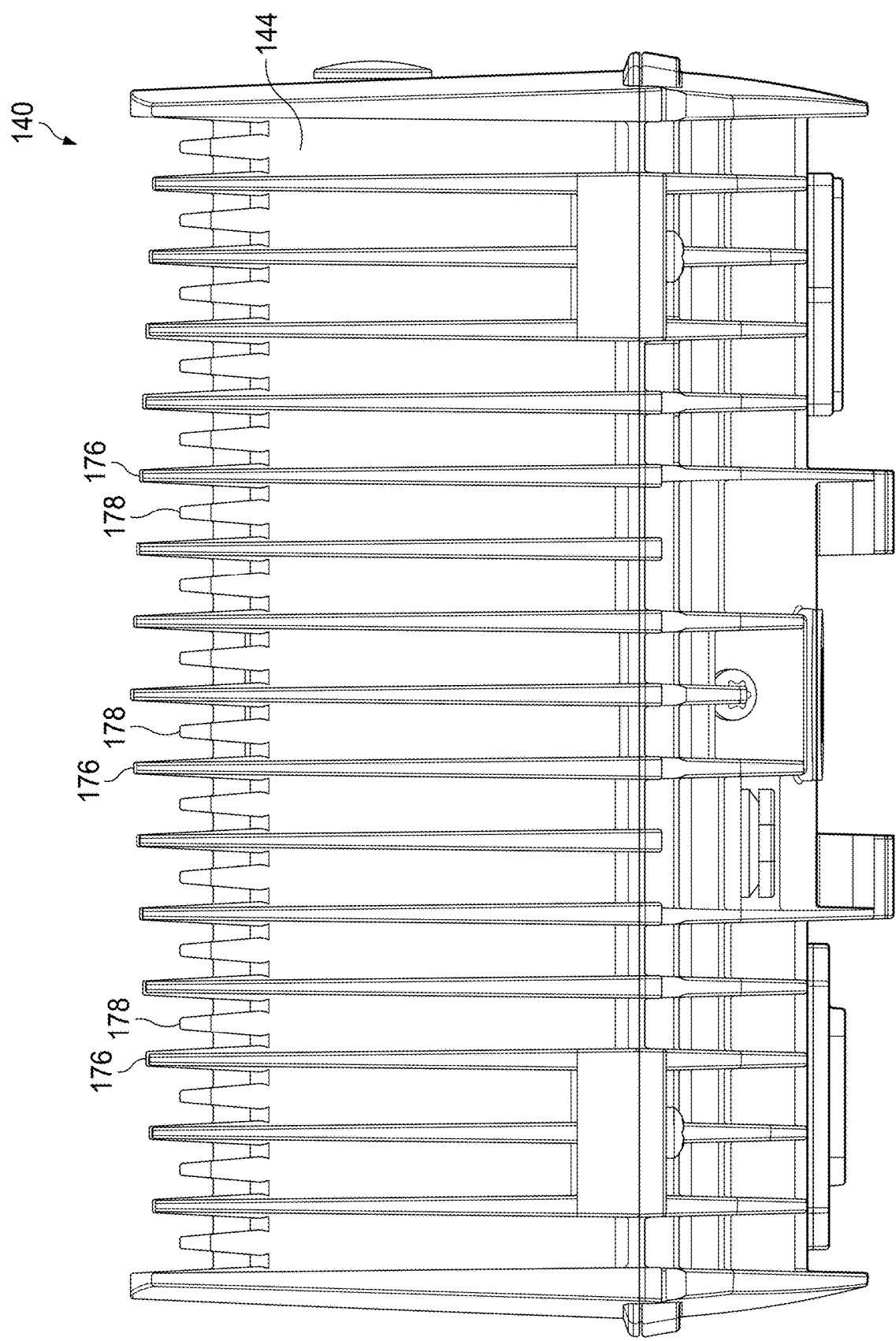
FIG. 13 is a bottom plan view of the ballast of FIG. 12.

FIGS. 12 and 13 illustrate an alternative embodiment of a light fixture 120 that is similar to, or the same in many respects as, the light fixture 20 illustrated in FIGS. 1-11. For example, the light fixture 120 can include a ballast 122, a bracket 124, and a reflector 126 coupled with the bracket 124. The ballast 122 can include a housing 140 that includes a front cover 142 and a rear cover 144. As illustrated in FIG. 13, the rear cover 144 can include a plurality of first fins 176 and a plurality of second fins 178. The rear cover 144, however, can be devoid of any shoulder portions (e.g., 84) that extend between respective ones of the first and second fins 176, 178.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather, it is hereby intended that the scope be defined by the claims appended hereto. Also, for any methods claimed and/or described, regardless of whether the method is described in conjunction with a flow diagram, it should be understood that unless otherwise specified or required by context, any explicit or implicit ordering of steps performed in the execution of a method does not imply that those steps must be performed in the order presented and may be performed in a different order or in parallel.

What is claimed is:

1. A light fixture comprising:
   a light module configured to generate light for delivery to an underlying plant; and
   a power module coupled with the light module and configured to facilitate powering of the light module;
   a heat sink associated with at least one of the light module and the power module, the heat sink comprising:
      a wall;
      a plurality of first fins that extend from the wall; and
      a plurality of second fins that extend from the wall; and
      a power module disposed at least partially within the housing and thermally coupled with the wall such that the plurality of first fins and the plurality of second fins cooperate to facilitate cooling of the power module, wherein:
  each first fin of the plurality of first fins has a first height;
  each second fin of the plurality of second fins has a second height;
  the second height is less than the first height;
  each first fin of the plurality of first fins is interposed between a pair of the second fins such that each first fin is immediately adjacent to the pair of the second fins; and
  each second fin of the plurality of second fins is interposed between a pair of the first fins such that each second fin is immediately adjacent to the pair of the first fins.

2. The light fixture of claim 1 wherein a ratio of the first height to the second height is between about 1.1:1 and about 1.7:1.

3. The light fixture of claim 2 wherein the first height is about 18 mm and the second height is about 11 mm.

4. The light fixture of claim 1 wherein:
  each first fin of the plurality of first fins is laterally spaced from adjacent ones of the first fins of the plurality of first fins by a first distance;
  each second fin of the plurality of second fins is laterally spaced from adjacent ones of the first fins of the plurality of first fins by a second distance; and
  the second distance is equal to or less than half of the first distance.

5. The light fixture of claim 4 wherein the first distance is about 11 mm and the second height is about 5.75 mm.

6. The light fixture of claim 1 further comprising a plurality of shoulder portions, wherein:
  each shoulder portion of the plurality of shoulder portions extends laterally between adjacent ones of the first fins of the plurality of first fins and the second fins of the plurality of second fins; and
  each shoulder portion of the plurality of shoulder portions has a third height that is less than the first height and the second height.

7. The light fixture of claim 6 wherein a ratio of the second height to the third height is between about 1.1:1 to about 3:1.

8. The light fixture of claim 1 wherein:
  each first fin of the plurality of first fins has a first length;
  each second fin of the plurality of second fins has a second length; and
  the second length is less than half of the first length.

9. The light fixture of claim 8 wherein a ratio of the first length to the second length is between about 2.1:1 to about 3:1.

10. The light fixture of claim 1 wherein each first fin of the plurality of first fins has a substantially tapered shape in one or more of a widthwise and a lengthwise direction.

11. The light fixture of claim 1 wherein each second fin of the plurality of second fins has a substantially tapered shape in one or more of a widthwise and a lengthwise direction.

12. A heat sink for at least one of a heat sink and a power module for a light fixture, the heat sink comprising:
  a wall;
  a plurality of first fins that extend from the wall; and
  a plurality of second fins that extend from the wall, wherein:
    each first fin of the plurality of first fins has a first height;
    each second fin of the plurality of second fins has a second height;
    the second height is less than the first height;
    each first fin of the plurality of first fins is interposed between a pair of the second fins such that each first fin is immediately adjacent to the pair of the second fins; and
    each second fin of the plurality of second fins is interposed between a pair of the first fins such that each second fin is immediately adjacent to the pair of the first fins.

13. The heat sink of claim 12 wherein a ratio of the first height to the second height is between about 1.1:1 and about 1.7:1.

14. The heat sink of claim 13 wherein the first height is about 18 mm and the second height is about 11 mm.

15. The heat sink of claim 12 wherein:
  each first fin of the plurality of first fins is laterally spaced from adjacent ones of the first fins of the plurality of first fins by a first distance;
  each second fin of the plurality of second fins is laterally spaced from adjacent ones of the first fins of the plurality of first fins by a second distance; and
  the second distance is equal to or less than half of the first distance.

16. The heat sink of claim 15 wherein the first distance is about 11 mm and the second height is about 5.75 mm.

17. The heat sink of claim 12 further comprising a plurality of shoulder portions, wherein:
  each shoulder portion of the plurality of shoulder portions extends laterally between adjacent ones of the first fins of the plurality of first fins and the second fins of the plurality of second fins; and
  each shoulder portion of the plurality of shoulder portions has a third height that is less than the first height and the second height.

18. The heat sink of claim 17 wherein a ratio of the second height to the third height is between about 1.1:1 to about 3:1.

19. The heat sink of claim 12 wherein:
  each first fin of the plurality of first fins has a first length;
  each second fin of the plurality of second fins has a second length; and
  the second length is less than half of the first length.

20. The heat sink of claim 19 wherein a ratio of the first length to the second length is between about 2.1:1 to about 3:1.

21. The heat sink of claim 12 wherein each first fin of the plurality of first fins has a substantially tapered shape in one or more of a widthwise and a lengthwise direction.

22. The heat sink of claim 12 wherein each second fin of the plurality of second fins has a substantially tapered shape in one or more of a widthwise and a lengthwise direction.

* * * * *